United States Patent
Bertrand et al.

(10) Patent No.: US 6,408,173 B1
(45) Date of Patent: Jun. 18, 2002

(54) BILLING ID CORRELATION FOR INTER-TECHNOLOGY ROAMING

(75) Inventors: Andre Bertrand, Val-Morin; Steven Rochefort, Pointe-Claire; Philippe Belanger, Laval, all of (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/442,847

(22) Filed: Nov. 18, 1999

Related U.S. Application Data

(60) Provisional application No. 60/124,918, filed on Mar. 17, 1999.

(51) Int. Cl.[7] ................................................. H04Q 7/20
(52) U.S. Cl. ....................... 455/406; 455/405; 455/408; 455/422; 455/432; 455/433
(58) Field of Search ................................ 455/405, 406, 455/407, 408, 422, 432, 433

(56) References Cited

U.S. PATENT DOCUMENTS

| | | | | |
|---|---|---|---|---|
| 5,610,974 A | * | 3/1997 | Lantto | 379/59 |
| 5,862,481 A | * | 1/1999 | Kulkarni et al. | 455/432 |
| 5,933,784 A | | 8/1999 | Gallagher et al. | 455/552 |
| 5,978,678 A | * | 11/1999 | Houde et al. | 455/433 |
| 5,995,842 A | * | 11/1999 | Jonsson | 455/462 |
| 6,038,439 A | * | 3/2000 | Rune | 455/406 |
| 6,094,578 A | * | 6/2000 | Purcell et al. | 455/426 |
| 6,259,914 B1 | * | 6/2001 | Koster | 455/432 |

* cited by examiner

Primary Examiner—Daniel Hunter
Assistant Examiner—A. T. Harry
(74) Attorney, Agent, or Firm—Jenkens & Gilchrist; Sandra Beauchesne

(57) ABSTRACT

A method and apparatus for generating a billing identifier for a subscriber from a first network roaming within a second network is disclosed. A node interconnecting the first and second networks receives a call message that does not include a billing identifier from the first network. A billing functionality within the node responsive to the call message generates a billing identifier enabling billing records within the second network to be associated with the subscriber from the first network. Messages containing the billing identifier are then transmitted to the second network from the interconnecting node.

16 Claims, 3 Drawing Sheets

BILLING ID CORRELATION FOR INTER-TECHNOLOGY ROAMING

RELATED APPLICATIONS

This application claims priority from and incorporates herein by reference the entire disclosure of U.S. patent application Ser. No. 60/124,918, filed Mar. 17, 1999.

BACKGROUND OF THE INVENTION

1. Technical Field of the Invention

The present invention relates to billing ID correlation, and more particularly, to a system and method for correlating billing ID information for subscribers roaming between wireless communication systems utilizing differing technologies.

2. Description of Related Art

Within cellular networks, a mobile subscriber may roam between service areas of different networks. Various techniques have been developed to enable a mobile subscriber to continue being provided with mobile telephone services once they have left their home service area. In a first alternative, once a mobile subscriber travels into a new mobile switching center (MSC) coverage area and turns on their mobile station for the first time, the mobile station attempts to register with the servicing MSC for the area by transmitting an associated identification number known as the international mobile subscriber identity (IMSI) number or mobile identification number (MIN). The serving MSC communicates with the home location register associated with the mobile station using the received IMSI/MIN. This communication is to inform the HLR of the mobile station's new location and to receive requisite subscriber information from the HLR necessary to provide mobile services to the newly registering mobile station.

However, when mobile subscribers move between networks utilizing different technologies, for example, a GSM system utilizing a GSM MAP protocol and a TDMA system using a ANSI-41 protocol, the various information required to be transmitted between the networks creates problems in converting information between the protocols useable by each system.

One of the problems arising with subscribers roaming from a GSM system to a TDMA system involves the inability to track billing information for a GSM subscriber within a TDMA system. This arises because of the differences in the way billing ID information is transmitted within the separate systems. The billing information is necessary in order to correlate a billing record generated in the gateway mobile switching center (GMSC) with a billing record generated in a visited mobile switching center (MSC). Since the billing information formats are different between GSM and TDMA networks (and also GSM networks where TAP is the utilized standard), there exists a need for a system capable of providing billing information when a GSM subscriber roams outside of its home technology network into a system utilizing a differing technology.

SUMMARY OF THE INVENTION

The present invention overcomes the foregoing and other problems with a system and method for generating a billing identifier for a call to a subscriber from a GSM network which is presently located within a TDMA or other technology network. A mobility gateway interconnecting the GSM network with the TDMA network receives a call message from the GSM network which does not include a billing identifier. A functionality within the mobility gateway generates a billing identifier enabling billing records within the TDMA network to be associated with the subscriber from the GSM network.

The billing identifier includes a mobility gateway switch ID, a mobility gateway switch number and an additional part which identifies the mobile country code and a mobile network code for the subscriber. The mobility gateway transmits the billing identifier to the TDMA network. Later, the mobile country code and mobile network code for the subscriber from the GSM system may be determined from the billing identifier, and the billing record within the TDMA network associated with the subscriber using this information.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
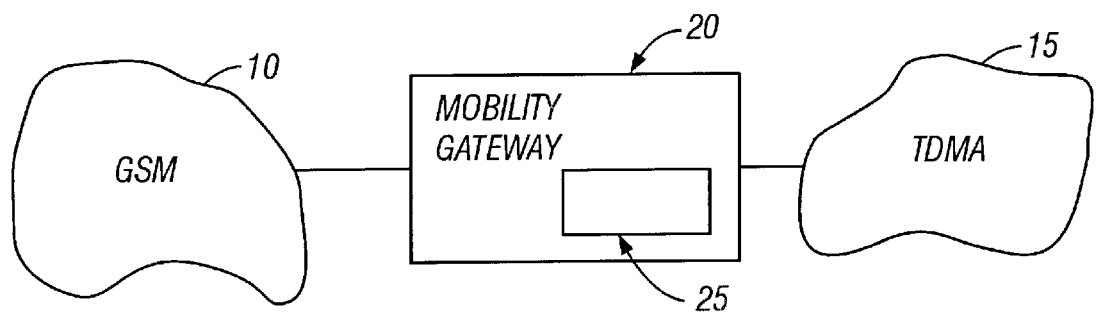
FIG. 1 is a functional block diagram illustrating a mobility gateway including the functionality of the present invention between a GSM network and a TDMA network.

Referring now to the Drawings, and more particularly to FIG. 1, there is illustrated a block diagram of a GSM network 10 utilizing a GSM MAP protocol interconnected with a TDMA network 15 using a ANSI-41 protocol through a mobility gateway 20. The mobility gateway 20 comprises an inter-system location register (ILR) or inter-working inter-operability function (IIF). The GSM network 10 enables subscribers to access telecommunications functionalities utilizing GSM technologies. The TDMA network enables mobile subscribers to access telecommunications functionalities using TDMA technologies.

The mobility gateway 20 enables mobile subscribers from the GSM network 20 to roam within the TDMA network 15 and mobile subscribers from the TDMA network to roam within the GSM network 10 while maintaining access to substantially all of the services and functionalities provided to them within their home network. While the present system is described with respect to interconnections between a TDMA system using the ANSI-41 protocol and a GSM system utilizing a GSM MAP protocol, it should be realized that the mobility gateway 20 and discussions with respect thereto may be extended to include other mobile protocols and networks such that the described system is not limited to use between GSM and TDMA networks.

As mentioned previously, a major problem with a GSM subscriber roaming within a TDMA network is the difference in the protocols utilized in each type of network with respect to the transmission of billing ID information. The present invention uses a billing functionality 25 to create a billing identifier for a call passing from a GSM to a TDMA network. A discussion of the manner in which calls are set up and billing information transmitted within TDMA and GSM networks will more clearly point out these differences.

Figure 2:
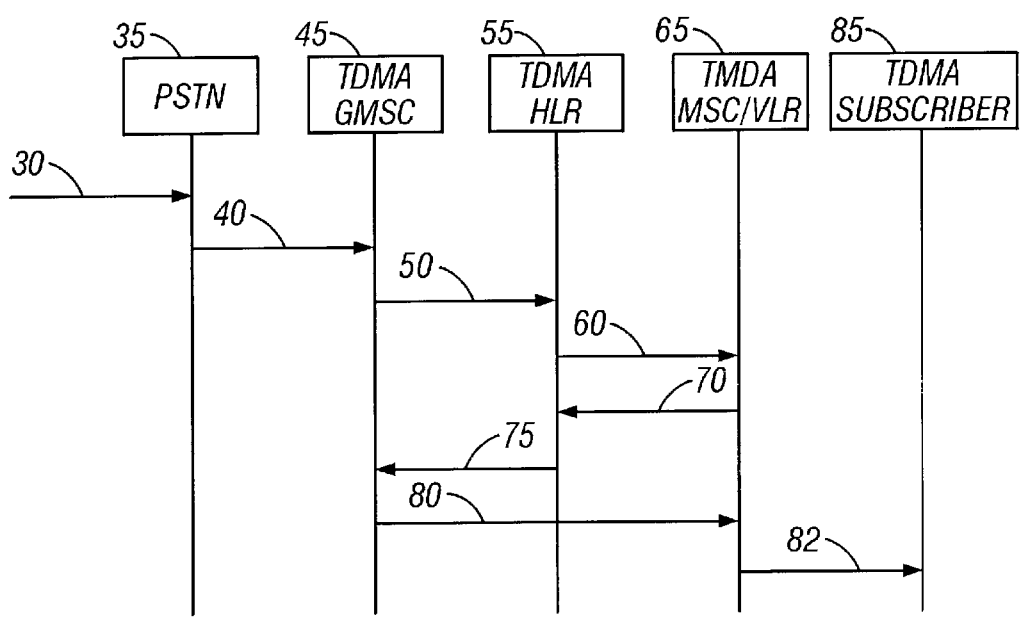
FIG. 2 is a signaling diagram illustrating a call connection within a TDMA network.

Referring now to FIG. 2, there is illustrated a signaling diagram describing a call connection within a TDMA system. It should be noted that the billing information within a TDMA call set-up is transmitted from the GMSC and expected by both the HLR 55 and MSC/VLR 65 during call set-up. An incoming call message 30 is received at a public switch telephone network (PSTN) 35. The PSTN 35 forwards a call message 40 to the TDMA GMSC 45. The TDMA GMSC 45 generates a location request message 50 which is transmitted to a TDMA HLR 55. The TDMA GMSC 45 includes billing information within the location request 50. If the call originated from a mobile phone, the serving MSC would serve as the GMSC and the PSTN would not be involved. The TDMA HLR 55 generates a routing request message 60 to the TDMA MSC/VLR 65. The HLR 55 also includes the billing information received from the GMSC 45 in the routing request message 60.

In response to the routing request 60, the TDMA MSC/VLR 65 generates a routing request return message 70 back to the TDMA HLR 55 which in turn generates a location request return message 75 to the TDMA GMSC 45. Using the information received in the location request return message 75, the TDMA GMSC 45 provides a call connection 80 with the MSC/VLR 65 over a voice trunk circuit. The TDMA MSC/VLR 65 may then establish a call connection 82 with the TDMA subscriber 85.

Figure 3:
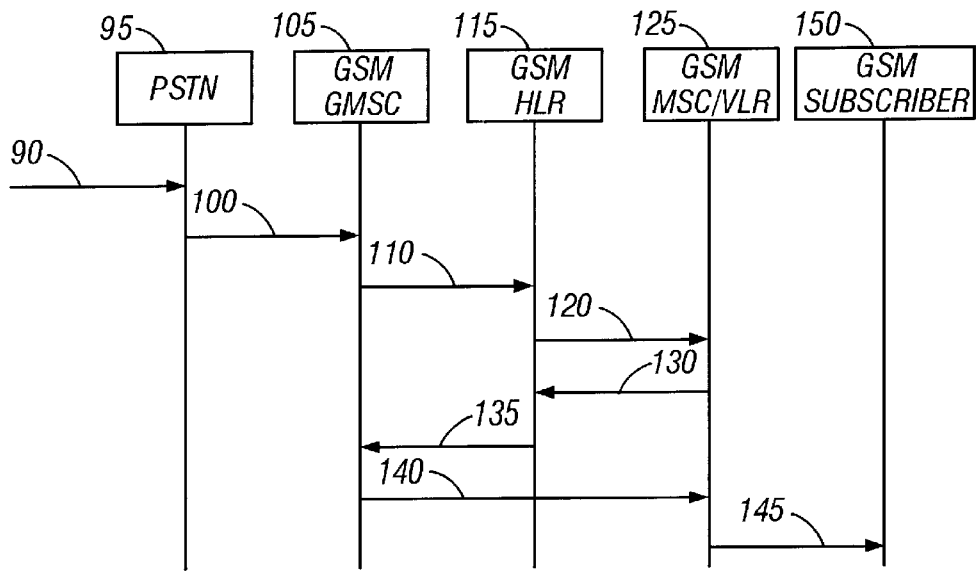
FIG. 3 is signal diagram illustrating a call connection within a GSM network.

A different call set-up procedure, with respect to the treatment of billing information, is illustrated in FIG. 3 for a GSM network. An incoming call message 90 is received at the PSTN 95 which generates an incoming call message 100 to the GSM GMSC 105. In response to the incoming call message 100, the GMSC 105 generates a send routing information request message 110 to a GSM HLR 115. Next, a provide roaming number message 120 is transmitted to the GSM MSC/VLR 125 from the HLR 115. The MSC/VLR 125 responds with a provide roaming number result message 130 to the HLR 115. The HLR 115 transmits a send routing information result message 135 to the GMSC 105. Using this information, a call connection 140 is established between the GMSC 105 and the MSC/VLR 125. In a GSM network, the billing information is generated within the GMSC and transmitted to the MSC/VLR with the call connection 140 on the voice trunk over the ISUP. The "network call reference" parameter within the ISUP IAM message (initial address message) contains the billing information. A call connection 145 may then be established between the MSC/VLR 125 and the GSM subscriber 150.

As can be concluded from the foregoing descriptions of FIGS. 2 and 3, if a GSM subscriber is roaming within a TDMA network, the TDMA MSC/VLR 65 will expect billing information to be provided in response to a call set-up command. This, of course, creates a problem since GSM systems do not transmit billing information until the call delivery is performed. Thus, a system for providing call billing information for GSM subscribers within a TDMA network is needed.

Figure 4:
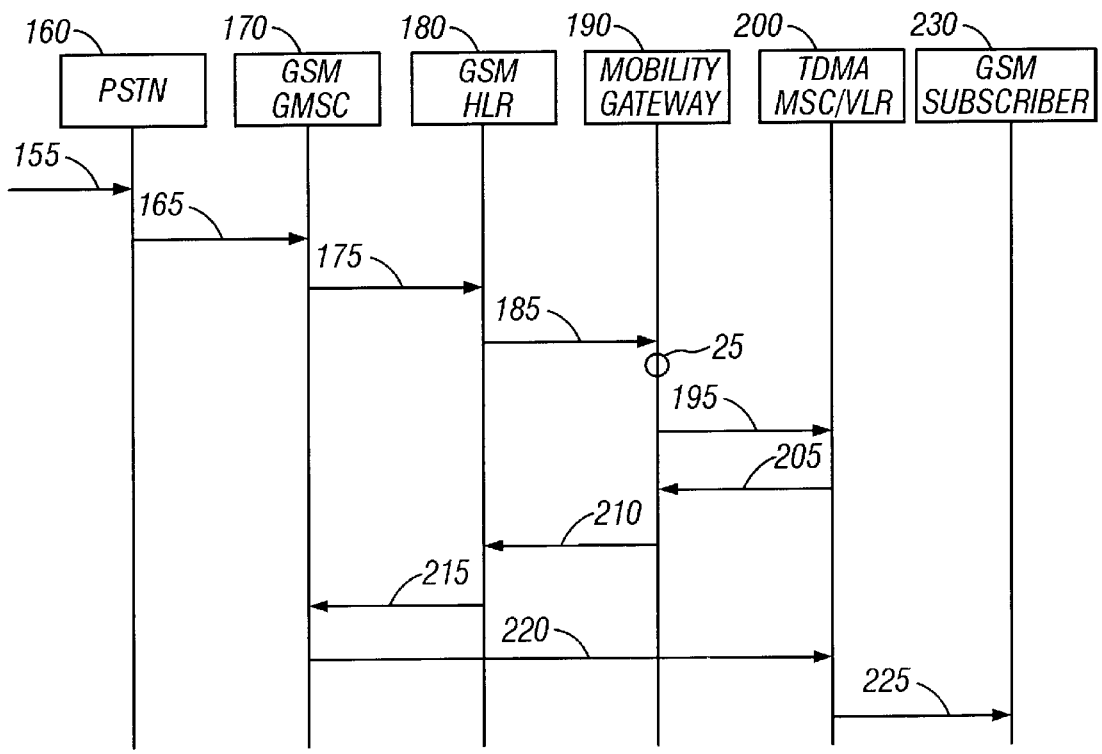
FIG. 4 illustrates a call connection to a GSM subscriber which has roamed into a TDMA network using the billing identifier according to the present invention.

Referring now to FIG. 4, there is illustrated a method of the present invention for providing billing information for a GSM subscriber in a TDMA network. In response to an incoming call 155, the PSTN 160 transmits an incoming call message 165 to the GSM GMSC 170. The GMSC 170 transmits a send routing information message 175 to the GSM HLR 180. The HLR 180 transmits a provide roaming number message 185 to the mobility gateway 190. Within the mobility gateway 190, a billing functionality 25 (FIG. 1) generates a billing identification 232 to be included within the routing request message 195 from the mobility gateway 190 to the TDMA MSC/VLR 200. This is necessary because the GSM system has not yet generated any billing information, and the TDMA MSC/VLR 200 expects billing information within the routing request message 195.

Figure 5:
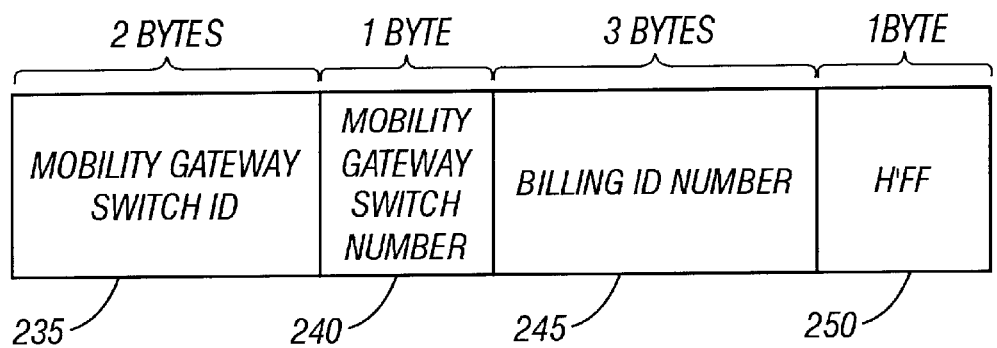
FIG. 5 illustrates the billing identifier produced by a mobility gateway according to the present invention.

The billing functionality 25 generates the billing identification 232 as illustrated in FIG. 5. The billing identification 232 includes three separate portions; namely, the system identifier 235, the switch number 240, the billing ID number 245, and the segment number 250. The system identifier 235 is two bytes long and includes the mobility gateway switch ID (SID). The switch number 240 is one byte long and includes the mobility gateway switch number. The billing ID number 245 is three bytes long and is based upon the GSM subscriber IMSI number. The billing functionality 25 uses the mobile country code (MCC) and the mobile network code (MNC) of the GSM subscriber to generate a 5 digit billing ID number 245. The remaining digits within the three byte portion are filled with a filler data (e.g., F), if necessary. The segment number 250 is not used and is only 1 byte long. The segment number 250 may be filled with a value such as H'FF. The system identifier and switch number provide information on the mobility gateway switch from which the call information came. The mobile country code and mobile network code within the billing ID number 245 are used to correlate the billing records of the GSM GMSC and the TDMA MSC to know which subscriber the call should be billed to.

Referring now back to FIG. 4, once the billing identification 232 has been generated by the billing functionality 25 within the mobility gateway 190, a routing request message 195 including the billing identification is transmitted to the TDMA MSC/VLR 200. The routing request message 195 from the mobility gateway 190 appears to come from a TDMA HLR from the point of view of the TDMA MSC/VLR 200. In response thereto, the MSC/VLR 200 transmits a routing request result message 205 to the mobility gateway 190 which transmits a provide roaming number result message 210 to the GSM HLR 180. Messages to the GSM HLR 180 from the mobility gateway 190 appear to come from a GSM MSC/VLR from the point of view of the GSM HLR. The GSM HLR 180 notifies the GSM GMSC 170 of the roaming number with a send routing information result message 215. A call connection 220 is provided between the GSM GMSC 170 and the TDMA MSC/VLR 200 over a voice trunk. The call connection 220 will necessarily include the billing information over the ISUP, but this information is neither expected nor interpreted by the TDMA MSC/VLR 200. A call connection 225 may then be established between the MSC/VLR 200 and the GSM subscriber 230.

Using the above described system and method, billing records associated with the GSM subscriber that has roamed into a TDMA network may be properly tracked and accounted for using the billing ID number such that the proper GSM subscriber 230 is billed for calls occurring while the subscriber is within the TDMA network. The derived billing ID number is used to direct charging information to the country and operator associated with the subscriber.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. An apparatus for billing a subscriber from a first network while roaming within a second network, comprising:

a first interface for connecting the apparatus to the first network;

a second interface for connecting the apparatus to the second network;

a module which upon reception of an incoming call request from the first network to the subscriber, the incoming call request not comprising a billing identifier, generates a billing identifier enabling billing records of the second network to be associated with the subscriber.

2. The apparatus of claim 1, wherein the billing identifier includes information enabling a determination of a country code and a mobile network code associated with the subscriber.

3. The apparatus of claim 1, wherein the billing identifier includes information enabling a determination of MSISDN/Directory Number associated with the subscriber.

4. The apparatus of claim 1, wherein the billing identifier includes a mobility gateway switch ID.

5. The apparatus of claim 1, wherein the billing identifier includes a mobility gateway switch number.

6. The apparatus of claim 1, wherein the first network comprises a GSM network and the second network comprises a TDMA network.

7. A method for generating a billing identifier for a call to a subscriber from a first network roaming within a second network, comprising the steps of:

receiving at a node interconnecting the first network and the second network a message from the first network which does not include a billing identifier;

generating a billing identifier enabling billing records of the second network to be associated with the subscriber from the first network; and transmitting the billing identifier to the second network.

8. The method of claim 7, wherein the step of generating further comprises the step of:

generating at least a portion of the billing identifier from a subscriber IMSI number.

9. The method of claim 7, wherein the step of generating further comprises the step of generating at least a portion of the billing identifier using a mobile country code and a mobile network code of the subscriber.

10. The method of claim 7, wherein the step of generating further comprises the step of generating at least a portion of the billing identifier to include a mobility gateway switch ID.

11. The method of claim 7, wherein the step of generating further comprises the step of generating at least a portion of the billing identifier to include a mobility gateway switch number.

12. The method of claim 7, wherein the first network comprises a GSM network and the second network comprises a TDMA network.

13. The method of claim 7, wherein the node comprises a mobility gateway.

14. The method of claim 7 further comprising the steps of:

determining a mobile country code and a mobile network code for the subscriber from the billing identifier; and associating a billing record within the second network with the subscriber using the mobile country code and the mobile network code.

15. A method for generating a billing identifier from a call to a subscriber from a GSM network roaming within a TDMA network, comprising the steps of:

receiving at a mobility gateway interconnecting the GSM network and the TDMA network a call message from the GSM network which does not include a billing identifier;

generating a billing identifier enabling billing records in the TDMA network to be associated with the subscriber from the GSM network, the billing identifier including a mobility gateway switch ID, a mobility gateway switch number and information derived from a mobile country code and a mobile network code for the subscriber; and transmitting the billing identifier to the TDMA network.

16. The method of claim 15 further comprising the steps of:

determining within the TDMA network the mobile country code and the mobile network code for the subscriber from the billing identifier; and directing charging information to a country and operator associated with the determined mobile country code and profile network code.

* * * * *